(12) United States Patent
Heidenreich et al.

(10) Patent No.: US 10,773,719 B2
(45) Date of Patent: Sep. 15, 2020

(54) DETERMINING ARRANGEMENT INFORMATION FOR A VEHICLE

(71) Applicant: Volkswagen Aktiengesellschaft, Wolfsburg (DE)

(72) Inventors: Toni Heidenreich, Minden (DE); Jens Spehr, Salzgitter (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 388 days.

(21) Appl. No.: 15/748,279

(22) PCT Filed: Jul. 1, 2016

(86) PCT No.: PCT/EP2016/065531
§ 371 (c)(1),
(2) Date: Jul. 10, 2018

(87) PCT Pub. No.: WO2017/016799
PCT Pub. Date: Feb. 2, 2017

(65) Prior Publication Data
US 2018/0304891 A1  Oct. 25, 2018

(30) Foreign Application Priority Data
Jul. 29, 2015 (DE) .......... 10 2015 214 338

(51) Int. Cl.
*B60W 30/12* (2020.01)
*G01C 21/36* (2006.01)
*G05D 1/02* (2020.01)

(52) U.S. Cl.
CPC ......... *B60W 30/12* (2013.01); *G01C 21/3602* (2013.01); *G05D 1/021* (2013.01); *G05D 2201/0213* (2013.01)

(58) Field of Classification Search
None
See application file for complete search history.

(56) References Cited

U.S. PATENT DOCUMENTS 8,452,535 B2    5/2013  Zeng et al. .............. 701/466
8,700,251 B1 *  4/2014  Zhu ..................... G01C 21/34
                                                          701/25
(Continued)

FOREIGN PATENT DOCUMENTS

DE   102006040333 A1   3/2008   ............ B60W 30/10
DE   102006040334 A1   3/2008   ............ B60W 30/10
(Continued)

OTHER PUBLICATIONS

Wu, Tao et al., "Vehicle Localization Using Road Markings," IEEE Intelligent Vehicles Symposium (IV), pp. 1185-1190, Jun. 23, 2013.
(Continued)

*Primary Examiner* — Kaveh Abrishamkar
(74) *Attorney, Agent, or Firm* — Slayden Grubert Beard PLLC

(57) ABSTRACT

The present invention relates to a method for determining arrangement information for a vehicle (10). The arrangement information comprises a position of the vehicle (10) and an orientation of the vehicle (10) with respect to a stationary coordinate system. In the method, a local driving lane arrangement in the surroundings of the vehicle (10) is detected with sensors (14) of the vehicle (10). A first driving lane arrangement is determined with respect to the stationary coordinate system in dependence on the local driving lane arrangement and a previously determined arrangement information item for the vehicle. A second driving lane arrangement is determined with respect to the stationary coordinate system in dependence on predefined map material. Similarity information is determined in dependence on a geometric similarity between the first driving lane arrange- (Continued)

ment and the second driving lane arrangement, and previously determined arrangement information for the vehicle (10) and d previously determined driving lane arrangement hypothesis are updated in dependence on the similarity information.

17 Claims, 5 Drawing Sheets

(56) References Cited

U.S. PATENT DOCUMENTS

| | | | |
|---|---|---|---|
| 8,751,157 B2 | 6/2014 | Simon | 701/431 |
| 8,775,063 B2 | 7/2014 | Zeng | 701/301 |
| 9,511,767 B1* | 12/2016 | Okumura | G08G 1/0104 |
| 9,530,062 B2* | 12/2016 | Nguyen | G06K 9/00798 |
| 10,281,927 B2* | 5/2019 | Switkes | G08G 1/22 |
| 10,520,952 B1* | 12/2019 | Luckevich | G05D 1/0293 |
| 2008/0040029 A1* | 2/2008 | Breed | G01S 19/50 |
| | | | 701/514 |
| 2010/0191461 A1* | 7/2010 | Zeng | B60W 40/072 |
| | | | 701/532 |
| 2017/0343369 A1* | 11/2017 | Anastassov | G08G 1/0125 |

FOREIGN PATENT DOCUMENTS

| | | | | |
|---|---|---|---|---|
| DE | 102010005293 A1 | 9/2010 | | B60W 30/12 |
| DE | 102010033729 B4 | 2/2012 | | B60W 30/12 |
| DE | 102011120497 A1 | 6/2012 | | B60W 30/08 |
| WO | 2017/016799 A1 | 2/2017 | | G01C 21/36 |

OTHER PUBLICATIONS

International Search Report and Written Opinion, Application No. PCT/EP2016/065531, 9 pages, dated Sep. 22, 2016.

* cited by examiner

DETERMINING ARRANGEMENT INFORMATION FOR A VEHICLE

CROSS-REFERENCE TO RELATED APPLICATIONS

This application claims priority to German Patent Application No. DE 10 2015 214 338.4 filed Jul. 29, 2015, the contents of which are hereby incorporated by reference in their entirety.

TECHNICAL FIELD

The present invention relates to method for determining arrangement information for a vehicle, in particular for determining an arrangement of a vehicle taking into consideration lane-precise map information while simultaneously improving an assumption or hypothesis of the arrangement of the lane. The present invention can in particular be used in conjunction with driver assistance systems that enable or support automatic vehicle guidance in a longitudinal and/or transverse direction.

To provide automatic driving functions for driver assistance systems in vehicles such as passenger cars or commercial vehicles, a comprehensive knowledge of the current vehicle surroundings is needed. An important aspect of the surroundings is the road infrastructure immediately in front of the vehicle in which automatic driving behavior is to be planned. To determine the most probable road infrastructure, various types of information sources can be used such as advance knowledge from lane-precise roadmaps in combination with a global positioning system (GPS), as well as a sensor-based perception of lanes, for example with the assistance of cameras. A problem is that all data sources such as the map, the GPS and the lane perception can be associated with a wide variety of topological and geometric ambiguities and measuring errors. For a uniform and inherently congruent picture of the surroundings, the most probable position and orientation relative to the map and the most probable lanes must be determined, taking into account all data sources and their errors.

In this context, DE 10 2011 120 497 A1 discloses a system for precisely determining the vehicle position within a lane. The method is executed by a vehicle that has an onboard computer, vehicle sensors, a satellite positioning unit, and a database with a map at the level of lanes in order to determine a new vehicle position by using map matching. In the method, new data are received from at least one of the vehicle sensors, and measured values are acquired from the vehicle sensors. The onboard computer calculates the propagation of the vehicle position with reference to sequential points in time. Moreover, the onboard computer carries out a curve adjustment process in which, for example, GPS coordinates of the vehicle are received and the location of the vehicle within the map at the level of lanes is identified. The onboard computer runs a tracking program that includes the use of a probability distribution for updating the vehicle position with regard to data particles, and runs a particle filtering program based on the data particles in order to calculate the new vehicle position. An observation model is updated based on results from the curve adjustment process. Data from the map at the level of lanes that identify at least one recorded lane line close to the vehicle are thereby read out, and a position of the lane line is calculated with reference to a reference system of the carrier vehicle. By using a distance analysis, the detected and recorded lane lines and lane boundaries are compared and an observation probability distribution is calculated with reference to image recognition data from a vehicle sensor camera using the compared data. When calculating a position of the lane line with reference to a reference system of the carrier vehicle, the lane lines obtained from a coordinate system of the map at the level of lanes are projected onto the reference system of the vehicle, and the detected and recorded lane lines and boundaries are compared, wherein a Euclidean-type analysis of the distance is used as the distance analysis.

DE 10 2010 033 729 B4 relates to a method for determining the position of a vehicle on a road. In the method, the position of the vehicle is determined with an initial accuracy using output from a satellite signal sensor. Data on an initial vehicle surrounding are obtained from a digital map for the position determined with the initial accuracy. Furthermore, data on lane markings are obtained in second vehicle surroundings with a line recognition sensor. Data on the vehicle's own movement are obtained with a vehicle dynamics sensor, and data on objects in third vehicle surroundings are obtained with an environment sensor. The position of the vehicle with at least lane-specific precision on the road is determined by combining the data on the first vehicle surroundings from the digital map and the data on the lane markings in the second vehicle surroundings with data on the vehicle's own movement or the data on objects in the third vehicle surroundings depending on the road situation.

When combining information from map data, positioning (such as GPS) and lane perception, normally it is assumed that part of the data is error-free and certain. This however is not generally true, and this assumption can therefore lead to an imprecise determination of the position and/or orientation of the vehicle with reference to the actual road. However, in particular in driver assistance systems that automatically control the vehicle on the road, such imprecisions are undesirable, in particular in the immediate vicinity.

SUMMARY

An object of the present invention is therefore to enable a reliable determination of the position and orientation of the vehicle with reference to the actual road.

This object is solved according to the present invention by a method for determining arrangement information for a vehicle, an arrangement determining device, and a vehicle. The dependent claims and the following description disclose embodiments of the invention.

According to the present invention, a method is provided for determining arrangement information for a vehicle. The term "arrangement information" relates to a position of the vehicle and an orientation of the vehicle with reference to a stationary coordinate system such as a world-encompassing global coordinate system such as the World Geodetic System (WGS for short). The stationary coordinate system can however also comprise any other coordinate system outside of the vehicle such as a country-specific coordinate system. In conjunction with the present discussion, the term "arrangement information" is referred to as also as "pose" and comprises at least one two-dimensional position in the stationary coordinate system as well as an orientation of the vehicle in relation to the stationary coordinate system. In the method, a local lane arrangement in the surroundings of the vehicle is detected with sensors of the vehicle. The lane arrangement can, for example, be detected with the assistance of vehicle cameras. The local lane arrangement indicates an arrangement of lanes in the surroundings of the vehicle with reference to the vehicle. A first lane arrangement is determined depending on the local lane arrangement and previously determined arrangement information for the vehicle. The first lane arrangement indicates an arrangement of lanes in the surroundings of the vehicle with reference to the stationary coordinate system. Expressed otherwise, a (first) lane arrangement is determined with reference to the stationary coordinate system from the local lane arrangement that results from the perspective or perception of the vehicle. Depending on given map material, a second lane arrangement for the current vehicle surroundings is determined with reference to the stationary coordinate system. Similarity information is determined on the basis of a geometric similarity between the first lane arrangement and the second lane arrangement, and previously determined arrangement information for the vehicle is updated depending on the similarity information. For example, shifts may be necessary in order to depict the first lane arrangement on the second lane arrangement. On the basis of these shifts, the arrangement information or pose for the vehicle can be updated. By determining the geometric similarity between the lane arrangement detected in the vehicle's surroundings and the map-based vehicle arrangement, sensor-based and map-based lane data can contribute equally to the updating of the arrangement information for the vehicle.

BRIEF DESCRIPTION OF THE DRAWINGS

Additional features and embodiments of the present invention are described in the following description and the appended claims.

Figure 1:
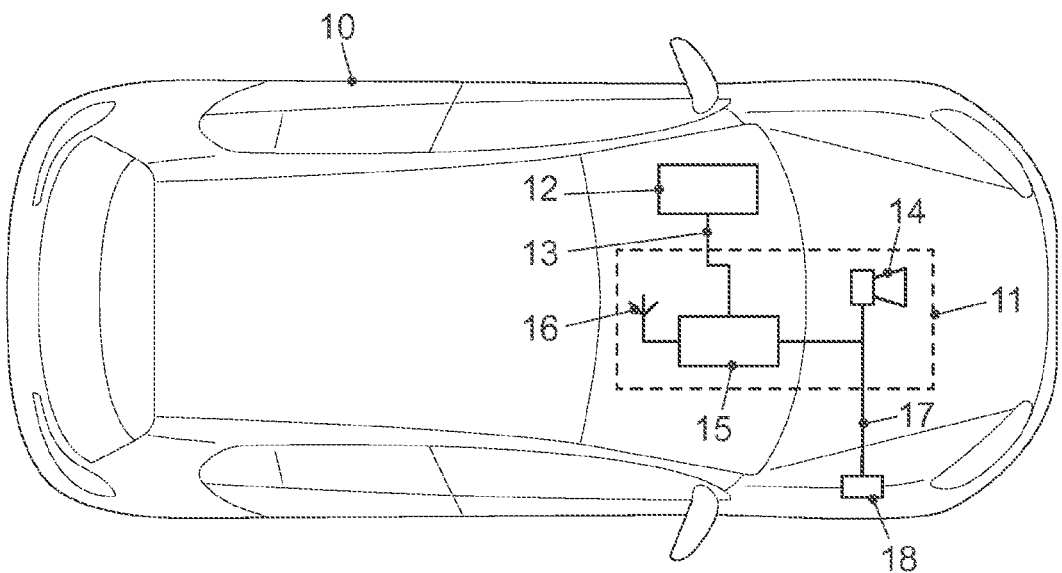
FIG. 1 schematically shows a vehicle according to an embodiment.

In one embodiment, a previously determined lane arrangement hypothesis is updated depending on the similarity information. The lane arrangement hypothesis indicates a hypothesis for an arrangement of lanes in the surroundings of the vehicle with reference to the stationary coordinate system. Accordingly, both the arrangement information, i.e., a pose estimation for the vehicle, as well as a lane arrangement hypothesis can be updated and optimized jointly based on the geometric similarity between the first and second lane arrangement.

In a further embodiment, the arrangement information of the vehicle comprises parameters of a multidimensional normal distribution for the position and orientation of the vehicle. For example, the position can comprise a two dimensional normal distribution for the position of the vehicle in a Cartesian coordinate system, and the orientation can comprise a further normal distribution for a rotational angle of the vehicle relative to a given alignment of the coordinate system. Coordinates of the lane arrangement hypothesis such as points along a center of a lane can also be represented as multidimensional normal distributions. The parameters of each of these normal distributions can, for example, comprise an expected value and a variance. Since the arrangement information and/or the lane arrangement hypothesis are both founded on a normal-distribution-based representation approach, errors and imprecisions in the associated detection of input data can be modeled and taken into account. In particular, errors or imprecisions in the map-based lane arrangement can also be taken into account. In addition, all sensor-based input data can be detected with cost-effective sensors since the respective uncertainties can be directly included in the calculation with the normal distributions.

In some embodiments, a lane of a lane arrangement is represented by a point list representing the center of the lane. Each point on the point list has parameters of a multidimensional normal distribution for a position with reference to the stationary coordinate system. Map material that comprises point lists that mark the center of the lanes is usually available and can therefore be used in the method. Since each point on the point list is represented as a normal distribution, uncertainties in the map material can be taken into account. For example, the coordinates indicated by the map material can be used in any dimension as the expected values for the normal distribution in the respective dimension. A standard deviation of the normal distribution in the respective dimension can, for example, be selected on the basis of the map accuracy. By using a connection of two or more sequential points from the point list, a desired orientation of a vehicle on a lane can be determined. The second lane arrangement determined depending on the given map material can contribute to both updating the position as well as updating the orientation of the vehicle.

In a further embodiment, the previously determined arrangement information for the vehicle is updated depending on vehicle odometry data. The vehicle odometry data can comprise, for example, information from wheel sensors, steering angle sensors or acceleration sensors of the vehicle. With the odometry data, a relative change in the arrangement of the vehicle with reference to a previous position can be determined. Based on the previously determined arrangement information, current arrangement information can, for example, be determined by including the odometry data, wherein imprecisions in the previously determined arrangement information and measuring imprecisions in the odometry data in the form of normal distributions can be taken into account. The vehicle odometry data including potential errors can therefore be taken into account in updating the arrangement information for the vehicle.

In a further embodiment, a stationary position of the vehicle is detected. The stationary position indicates a position of the vehicle with reference to the stationary coordinate system. The stationary coordinate system can, for example, be a global coordinate system, wherein the stationary position is detected, for example, by using a satellite positioning system. The previously determined arrangement information for the vehicle is updated depending on the detected stationary position of the vehicle. Since the detected stationary position of the vehicle can have a measuring imprecision, the stationary position of the vehicle in the form of a multidimensional normal distribution can be taken into account when updating the previously determined arrangement information.

With the above-described normal-distribution-based representation approach for the arrangement information for the vehicle and the additional information for updating the arrangement information for the vehicle such as odometry data, map material information, camera-based surroundings information and satellite-based positioning information, this information containing measuring errors, including its possible errors, can be easily offset for updating the arrangement information for the vehicle. In particular, the normal-distribution-based representation approach allows the arrangement information to be updated within a few milliseconds in a conventional computing system such as, for example, a microprocessor controller in a vehicle, and is accordingly suitable for real-time calculation in the vehicle. A repetition rate for the repeated performance of the method can, for example, lie within a range of 25 to 400 repetitions per second.

In a further embodiment, additional features in the surroundings of the vehicle can be compared with corresponding features of the map material in order to determine the similarity information. For this, lane information is determined for the first lane arrangement by means of the sensors of the vehicle. The lane information comprises, for example, lane marking types, stop line positions or traffic sign positions. Marking types can, for example, be a solid lane marking, a dashed lane marking, a double solid line, etc. The lane information for the first lane arrangement is compared with map-material-based lane information for the second lane arrangement. This can improve the assignment of the lane detected by the sensors of the vehicle to lanes from the map material.

In a further embodiment, the first lane arrangement comprises an arrangement of at least two lanes and, alternatively or in addition, the second lane arrangement comprises an arrangement of at least two lanes. To determine the similarity information, a plurality of items of pair similarity information is determined. Each of the plurality of items of pair similarity information is determined depending on a geometric similarity of a respective pair of two lanes. A respective pair of two lanes comprises a lane from the first lane arrangement and a lane from the second lane arrangement. Expressed otherwise, pair similarity information is determined in each case for each combination of a lane from the first lane arrangement and a lane from the second lane arrangement. If, for example, the first lane arrangement comprises two lanes and the second lane arrangement also comprises two lanes, four items of pair similarity information are determined, i.e., a first one for a similarity between a first lane of the first lane arrangement and a first lane of the second lane arrangement, a second item of pair similarity information for a geometric similarity of the first lane of the first lane arrangement and the second lane of the second lane arrangement, a third item of pair similarity information for a geometric similarity between a second lane of the first lane arrangement and the first lane of the second lane arrangement, and a fourth item of pair similarity information for a geometric similarity between the second lane of the first lane arrangement and the second lane of the second lane arrangement. By processing any number of lanes, the arrangement information for the vehicle and the lane arrangement hypothesis can be updated even in complex scenarios such as intersections or exits. For example, the previously determined arrangement information for the vehicle can be updated depending on the similarity information by determining a respective item of weighted update information depending on the respective pair similarity information for a respective item of pair similarity information of the plurality of items of pair similarity information. The weighted update information comprises arrangement information for the vehicle under the assumption that the lanes of the respective pair relate to the same actual lane. The weight of the weighted update information indicates a probability that the lanes of the respective pair relate to the same actual lane. The previously determined arrangement information is updated depending on the weighted update information in that, for example, an update based on pair similarity information is multiplied by the weight. The arrangement information of the vehicle and the weighted update information can in particular each comprise parameters of a multidimensional normal distribution for the position and orientation of the vehicle. To update the previously determined arrangement information for the vehicle, the normal distribution of the arrangement information is multiplied by the normal distributions of the items of update information. Consequently, the arrangement information for the vehicle can be easily updated even in complex situations and scenarios such as multi-lane roads, intersections and exits.

According to a further aspect, moreover, an arrangement determining device is provided for determining arrangement information for a vehicle. The arrangement information comprises a position of the vehicle and an orientation of the vehicle in a position on a stationary or global coordinate system. The arrangement determining device comprises sensors for determining a local lane arrangement in surroundings of the vehicle. The sensors can, for example, comprise cameras of the vehicle. The local lane arrangement indicates an arrangement of lanes in the surroundings of the vehicle with reference to the vehicle and can, for example, be determined from image data from the camera, optical properties of the camera and an arrangement of the camera by a suitable image processing. The arrangement determining device moreover comprises a processing device that is capable of determining a first lane arrangement depending on the local lane arrangement and previously determined arrangement information for the vehicle. The first lane arrangement indicates an arrangement of lanes in the surroundings of the vehicle with reference to the stationary coordinate system. Expressed otherwise, the processing device converts the local lane arrangement into a corresponding global lane arrangement, taking into account the last determined arrangement information or pose for the vehicle. The processing device is moreover able to determine a second lane arrangement depending on given map material. The second lane arrangement indicates an arrangement of lanes in the surroundings of the vehicle with reference to the stationary coordinate system. The second lane arrangement can, for example, be determined from the given map material using the previously determined arrangement information for the vehicle. Finally, the processing device determines a similarity information depending on a geometric similarity of the first lane arrangement and the second lane arrangement. This similarity information is used to update the previously determined arrangement information for the vehicle. Accordingly, the arrangement determining device is suitable for performing the above-described method or one of its embodiments and therefore also comprises the advantages described in conjunction with the method.

Another aspect relates to a vehicle that comprises the above-described arrangement determining device and a driver assistance system. The driver assistance system provides an automatic driving function for the vehicle, for example an automatic longitudinal and lateral regulation of the vehicle. The driver assistance system is coupled to the arrangement determining device, and the automatic driving function is performed based on the updated arrangement information from the arrangement determining device. The vehicle therefore also comprises the advantages described above in conjunction with the method and its embodiments.

As described above, a previously determined lane arrangement hypothesis can be updated depending on the similarity information. The lane arrangement hypothesis indicates a hypothesis for an arrangement of lanes in the surroundings of the vehicle with reference to the stationary coordinate system. The updated lane arrangement hypothesis can be taken into account by the driver assistance system when performing the automated driving function in that, for example, the arrangement information or pose of the vehicle is linked to the updated lane arrangement hypothesis and in particular a lateral regulation of the vehicle is controlled on this basis.

Although the above-described embodiments of the present invention have been described independent of each other, it is clear that these embodiments can be combined in full and in part with other as desired.

The present invention will be described in detail below with reference to the drawings.

FIG. 1 shows a vehicle 10 with an arrangement determining device 11 and a driver assistance system 12. The driver assistance system 12 is able to perform an automatic driving function for the vehicle 10. For this, the driver assistance system 12 requires information on the lane in which the vehicle 10 is currently located, and how a current position of the vehicle 10 is related to the lane. This information is provided by the arrangement determining device 11 via a connection 13. The arrangement determining device 11 comprises a sensor 14, such as a camera or a plurality of cameras, for detecting a local lane arrangement in surroundings of the vehicle 10. The local lane arrangement can, for example, be calculated by a processing device 15 of the arrangement determining device 11 with the assistance of a suitable imaging processing taking into account the arrangement of the camera 14 on the vehicle 10. The processing device 15 is moreover equipped with a global positioning system that, for example, receives signals from satellites via an antenna 16 and calculates a global position of the vehicle 10 therefrom. The processing device 15 can moreover be connected by a vehicle bus 17 to other components in the vehicle 10 that provide vehicle odometry data. For example, the processing device 15 can receive information from a wheel sensor 18 in order to determine a movement of the vehicle 10. Alternatively or in addition, further wheel sensors, acceleration sensors or a steering angle sensor can be coupled to the processing device 15 to calculate odometry data of the vehicle 10.

Figure 2:
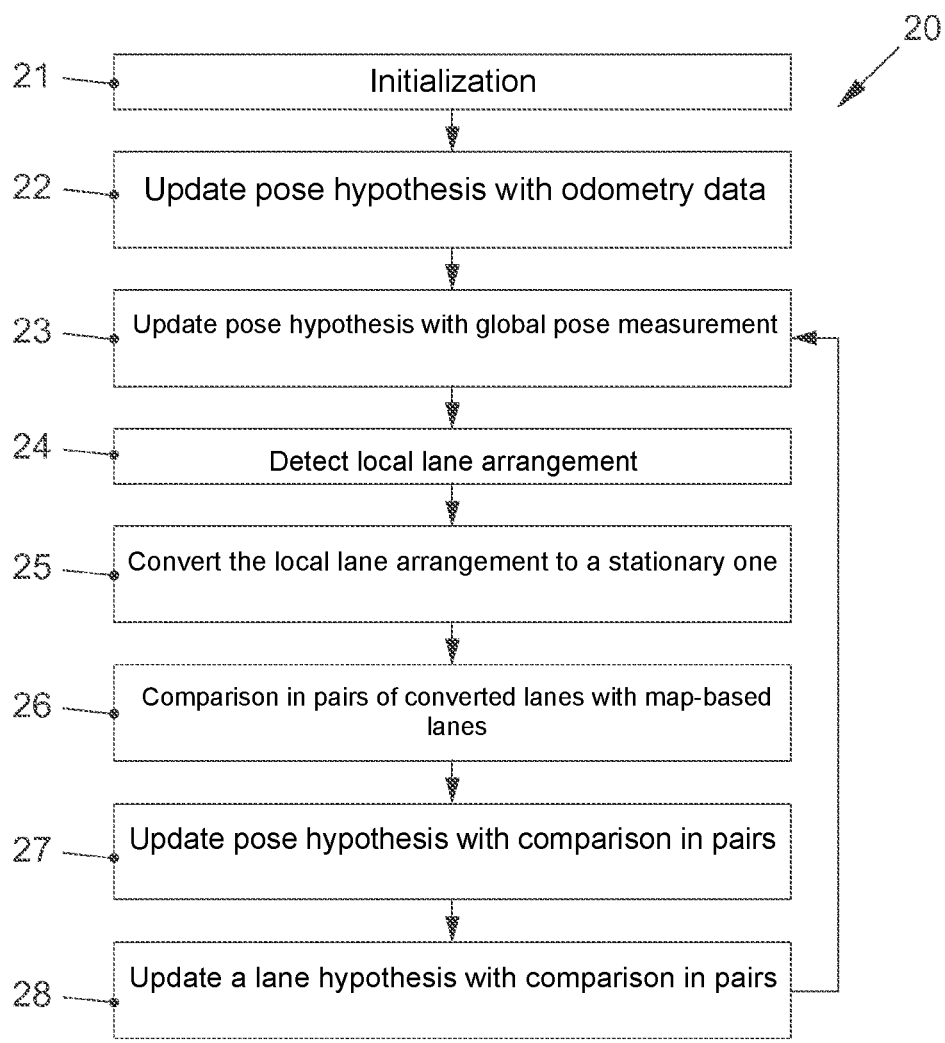
FIG. 2 shows steps of a method for determining arrangement information for a vehicle according to an embodiment.

For the driver assistance system 12 to provide an automated driving function, the driver assistance system 12 needs comprehensive knowledge of the current surroundings of the vehicle 10 and the actual position and orientation of the vehicle 10 in the current surroundings. An important aspect of these surroundings is the lane infrastructure in the immediate vicinity in front of the vehicle 10 since the automated behavior of the vehicle is to be planned in this area, such as longitudinal and lateral regulation of the vehicle. To determine the most probable lane infrastructure, various types of information sources are used by the arrangement determining device 11: Previous knowledge from lane-precise roadmaps in combination with global positioning, for example with GPS, as well as a sensor-based perception of the lanes from, for example, the camera 14. For a uniform and inherently congruent picture of the surroundings, the most probable pose, i.e., position and orientation of the vehicle 10, relative to information from the map and the most probable lane is determined, taking into account all data sources and their errors. For this, the method described in detail in FIG. 2 is performed in the arrangement device 11.

As input data, the arrangement determining device 11 uses a global position measurement, a lane-precise digital roadmap as well as a so-called perception method that generates lane hypotheses from sensor data, in particular from the camera 14.

The global position measurement can, for example, be performed by a global positioning system such as GPS or Galileo. The measuring method determines a two-dimensional position such as in a geodesic global reference system, such as the World Geodetic System, WGS for short. Alternatively, the two-dimensional position can be determined in any other stationary, i.e., non-vehicle related reference system. The measuring method of the global position measurement will be or is assigned a measuring variance. Furthermore, with the assistance of the global position measurement, a global orientation of the vehicle including a corresponding measuring variance is determined, for example with the assistance of the compass. The two-dimensional position in conjunction with the orientation of the vehicle will hereinafter be termed the arrangement information for the vehicle or the pose of the vehicle.

The lane-precise digital roadmap provides information for individual lanes. The lanes are defined as a list of points that each possess a position including the modeling variance. The point list thereby represents the center of the lane, and all points on the connecting lines are interpreted as a linear interpolation of the adjacent modeled points. Furthermore, an expansion with additional features is possible such as the lane marking types on the right and left edge of the lane, or positions of stop lines and traffic signs.

The perception method generates lane hypotheses from sensor data of vehicle sensors. The sensors and methods used to determine the lane hypotheses are irrelevant. In particular, however, cameras on the vehicle can be used for example, and the lane hypotheses can be determined based on digital image processing. As the result of the method, the lane hypotheses are in the form of point lists that each represent the centers of the lanes. Since the perception method is performed with the assistance of vehicle sensors, the points on the point list are located in a coordinate system oriented toward the vehicle, a so-called local reference system as so-called "ego local coordinates". The coordinates of the points also have a measuring variance. As an expansion, the same additional features as in the map can also be extracted from the sensor data such as the lane marking types, stop lines and traffic sign positions.

Moreover, vehicle odometry data that describe the vehicle's own movement continuously or between certain times, so-called time steps, are used as input data for determining the arrangement information.

The method 20 shown in FIG. 2 comprises method steps 21 to 28. An initialization occurs in step 21. For example, pose hypotheses at a current GPS position are thereby determined, map material is loaded, and a current lane hypothesis is determined from the map material for the current GPS position. The following steps 22 to 28 are run cyclically, wherein a cycle lasts, for example, a few milliseconds such as 3 to 40 ms. The cycle length can, for example, correspond to a length that is needed for sensor data to be detected for example by the camera 14, the wheel sensors 18 and the global positioning system.

Since measuring errors and imprecisions in the map information as well as the perceived surroundings are to be taken into consideration in the method 20, the pose and lane hypotheses are represented as multidimensional normal distributions (Gaussian mixed distribution). Likewise, information for updating the pose and lane hypotheses, such as results of the global position measurement, the perception method and odometry data as well as information from the digital roadmap, are represented as corresponding multidimensional normal distributions. Updates can then for example be realized as a multiplication of all of the components of these distributions. In this manner, the pose hypothesis from the last time step or from the initialization is updated in step 22 by means of the odometry data and thereby transferred to the current processing time. In step 23, the pose hypothesis is updated with the assistance of the global position measurement. In step 24, the local lane arrangement is detected with the assistance of the above-described perception method and, in step 25, these locally detected lanes are transferred to the global or stationary coordinate system with the assistance of the current pose hypothesis. Accordingly, a first lane arrangement is available that was formed based on the locally detected lanes. For the current pose hypothesis of the vehicle 10, a second lane arrangement is determined from the map material. The sensor-based lanes from the first lane arrangement are then each compared in pairs with the map-based lanes from the second lane arrangement (step 26). For this, a geometric similarity with a respective lane pair is determined, as well as for systematic displacements of the lanes relative to each other. The similarity value can then be enriched and improved by the comparison of the additional information such as the lane marking types or stop line and traffic sign positions. Each weighted pose update is created under the assumption that the respective lane pair represents the same actual lane. The pose results from the different displacements relative to each other, and the weight results from the similarities of the lanes to each other. In step 27, the current pose hypothesis is updated with the assistance of all of the pose updates obtained in this manner. The result is a new pose hypothesis that can be used in the next cycle of the method. In addition, the pose hypothesis can be sent to the driver assistance system 12. In step 28, the lane hypothesis from the initialization or last cycle of the method is updated with the assistance of the sensor-based lanes transferred to the global coordinate system, and in addition, the results of the comparison of the lane data from step 26 are incorporated into the update of the lane hypothesis. The updated lane hypothesis can also be sent to the driver assistance system 12 so that the driver assistance system 12 can control the vehicle 10, in particular in the immediate vicinity, based on the pose hypothesis and the lane hypothesis. The lane hypothesis can be expanded from map data up to the desired perception horizon and provided to the driver assistance system 12.

In the method 20, the determination of the pose and updating of sensor-based lane data with map data occur simultaneously and hence are jointly optimized. The method works with any number of lanes and is therefore able to also cover complex scenarios such as intersections and exits. All sensor-based input data can originate from cost-effective sensors since the respective uncertainties can be directly included in the calculation with the normal distributions. Likewise, comparatively simple map data can be used so that, for example, geo-referenced sensor features do not have to be directly available in the map. The normal-distribution-based representation makes it possible to calculate the entire cycle within a few milliseconds with a normal microprocessor or a normal computing unit in a vehicle and can therefore be used in real time for calculating in the vehicle.

An embodiment of the above-described method that uses a factor-graph-based approach will be described in detail below.

In the method, a rough localization of the vehicle is performed using cost-effective sensors, such as GPS sensors and camera-based lane recognition, and maps with an accuracy at the lane level, wherein the perceived road system and the positioning are updated simultaneously. A sum product algorithm that is adapted to a factor graph is used which models the dependencies between observed and hidden variables. The sum product algorithm is also termed belief propagation or sum product message passing. Belief propagation can be used in conjunction with acyclical graphs or general graphs. When the graphs contain cycles or loops, the algorithm is also termed loopy belief propagation. Belief propagation belongs to the so-called message passing algorithms that can be used on factor graphs. Message passing within the graphs is based on multimodal normal distributions for a variable representation and quadratic noise models, which leads to a fast and precisely defined calculation structure. Simulations show that the positioning accuracy is insensitive to most types of measuring noise except for a constant offset of global pose measurement that, however, can still be reduced by a factor of 8. Tests in real environments with an average positioning error of 1.71 m in a city scenario demonstrate the applicability of the approach in automatic driving tasks, as well as its usefulness in real time with an average runtime of 3 ms with a typical computing system.

The trend in driver assistance systems (DAS) is toward supported or even guided automatic driving. Such tasks require a reliable understanding of current surroundings, in particular the recognition of drivable areas, as well as the geometric and topological structure of the road and the lane network therein.

In such driving tasks, people use their visual perception and prior knowledge of typical situations in combination with additional information sources such as roadmaps to improve the understanding of a scene. Automatic systems use the same principles by using sensor input from, for example, cameras or range sensors and static sources such as maps in conjunction with global positioning systems. These systems suffer, however, from distorted and faulty input data. Lane recognition based on sensor input can be impaired by geometric noise, can overlook lanes completely, or recognizes non-existing lanes, i.e., is convinced by incorrect results which leads to a topological lack of clarity that increases at least linearly with distance. Roadmap data can provide a topological structure with an accuracy at the lane level with an infinite range. Their production can, however, have geometric inaccuracies and even other topological errors, for example from changes in the actual road network. In addition, the required global positioning system normally depends on external input such as from satellites. Consequently, it is only accurate up to a certain degree.

In the embodiment described below, distorted lane hypotheses from sensor input, distorted roadmaps with a precision at the lane level and distorted global positioning information are therefore used to simultaneously improve the accuracy of all three. This is achieved in that all of the measured values and assignments between sensor data and roadmap data are compiled as boundary conditions in a specially designed factor graph with optimum parameters that are found by using loopy belief propagation.

In the following, first a theoretical background of factor graphs and loopy belief propagation is provided to the extent necessary for a comprehensive understanding of the embodiment described afterward.

Factor graphs are graphical representations that are used for groups of probability variables and their conditional dependencies. A factor graph divides a connected probability distribution P(x1, x2, ... xn) into factors $\psi_i$ depending only on a subgroup of random variables as shown in equation (1), wherein Z is a normalizing constant.

$$P(x_1, x_2, \ldots, x_n) = \frac{1}{Z} \prod_i \psi_i(x_{\psi_i^1}, x_{\psi_i^2}, \ldots, x_{\psi_i^m}) \quad (1)$$

Figure 3:
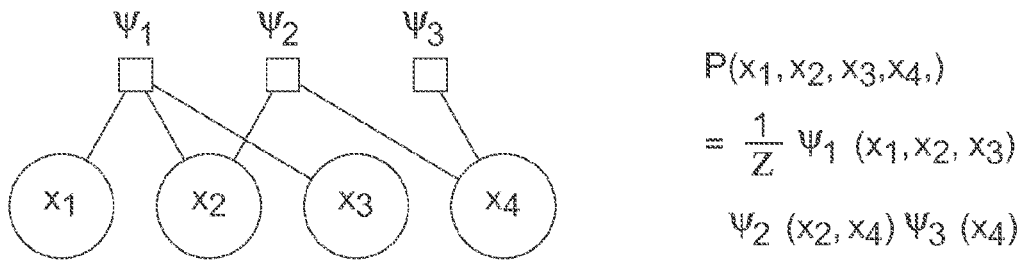
FIG. 3 shows an example of a graphic representation of a factor graph that can be used to determine arrangement information for a vehicle.

Factor graphs are normally represented as unidirectional graphs with circular nodes as variables and rectangular nodes as factors that are connected by edges for each variable used in the factor as shown in FIG. 3.

A normal task is to determine the marginal distribution of covered, so-called hidden variables $X_h$ taking into account the given values of known observed variables $X_o$. To this effect, the factor graph can be reduced so that it depicts the conditional probability $P(X_h|X_o)$ by removing all observed variables from the graph and setting all of the occurrences of the variables in the factors to the observed value. These observations can be distributed with an information passing algorithm, a so-called message passing algorithm, for example the sum product algorithm, using the dependencies of the factors by sending recursive information, so-called messages, $m_{i \to j}$ according to equation (2).

$$m_{i \to j} = \int_{x \in S_i \setminus S_j} \psi_i(x) \prod_{k \in N_i \setminus \{j\}} m_{k \to i} \, dx \quad (2)$$

An outgoing message from node i to node j is the product all the incoming messages from all of the neighbors $N_i$ with the exception of j-times the associated factor, which is marginalized to the subset of variables $s_j$ used by the node j. For variable nodes, $\psi_i$ can be assumed to be 1. The final marginal distribution of a variable is the product of all of the incoming messages.

Since incoming messages must be known beforehand, message processing must be synchronized in order to fulfill this precondition. Tree-like factor graphs guarantee such a time sequence that finds the globally correct solution. Cyclical graphs, however, do not have valid scheduling since all of the messages in a cycle need an input from another message in the cycle. Nevertheless, empirical studies have shown that the sum product algorithm can find local optimum solutions if all the updates are repeated until convergence. In this case, messages with a uniform distribution can be initialized. The resulting algorithm is then termed loopy belief propagation.

In the embodiment described below, a factor graph is used for a simultaneous localization and imaging technique (simultaneous localization and mapping, SLAM) to determine lanes of a road network in a general sense for any curves and the arrangement of the vehicle therein. To achieve this, the following two tasks must be taken into account. First, the problem of representing the present probability distribution of the existing features (i.e., poses and lanes) with methods for incorporating new measurements into these probabilities.

And second, the association problem between measurements of identical objects in the real world, i.e., lanes observed at different times and lanes from a roadmap. The association problem and measured value updates of variables are frequently solved separately. They can, however, be solved simultaneously by taking into account several possible associations at once. The general principle is portrayed in FIG. 4, wherein a current pose and current lane hypotheses are combined with new lane observations by determining suitable associations, and both the lane geometry and pose are updated based on these associated lanes. In addition, global pose measurements that are provided by global positioning systems and odometry measurements that are provided by the vehicle's measuring units are taken into account.

Figure 4:
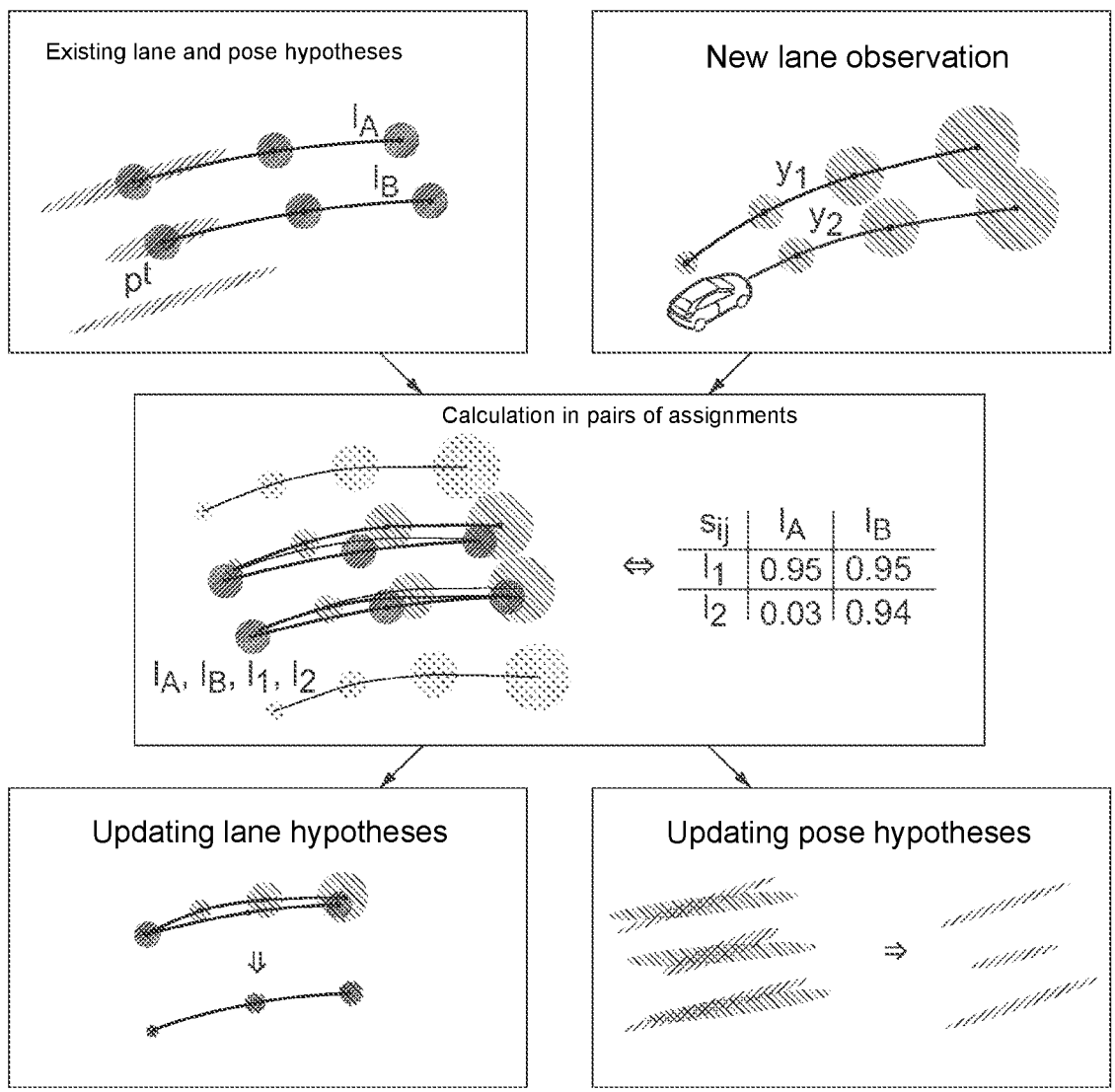
FIG. 4 shows a schematic representation of an updating cycle for a lane hypothesis and a pose hypothesis according to an embodiment.

FIG. 4 schematically portrays an updating cycle. Existing multimodal pose hypotheses and lane hypotheses are combined with new lane observations by searching for similar lanes and using these associations to update the lanes and poses.

Both problems are modeled as a single factor graph that incorporates all of the additional input sources using the variables defined in Table 1.

| Symbol | Description | Quantity | |
|---|---|---|---|
| $q^t$ | Global pose measurement at time t | P | o |
| $o^t$ | Odometry measurement from t −1 to t | P | o |
| $y_i$ | i-th lane observed from sensor data in ego local coordinates | C | o |
| $m_j$ | j-th lane from the map material in global coordinates | C | o |
| $p^t$ | Actual global pose at time t | P | h |
| $l_i$ | Actual lane that corresponds to the i-th lane observed from sensor data or to the lane from the map material in global coordinates | C | h |
| $s_{ij}$ | Indicator of whether $l_i$ and $l_j$ are the same | {0, 1} | h |

All of the pose-related variables are defined in the quantity $P = R^2 \cap R_{[-\pi,\pi]}$ of a 2-D position with an orientation or alignment. All curve-related variables are defined as colored lane middle lines in C, wherein the extent of all functions depicts a range parameter $z \in [z_1, z_2]$ at a pose in P using a natural parameterization, i.e., the arc length of the curve $\gamma$ between $\gamma(z_i)$ and $\gamma(z_j)$ is $|z_i - z_j|$. The variables in the table are marked as monitored (o) or covered (h). It should be noted that the number of variables in the factor graph must be known beforehand. Consequently, an individual variable for the corresponding actual lanes that correspond to the respective lane observation is used since its total number is determined beforehand or can be selected to be sufficiently large. The true number of actual lanes is unknown and can only be implicitly derived from the reference variables for each pair of lanes.

Figure 5:
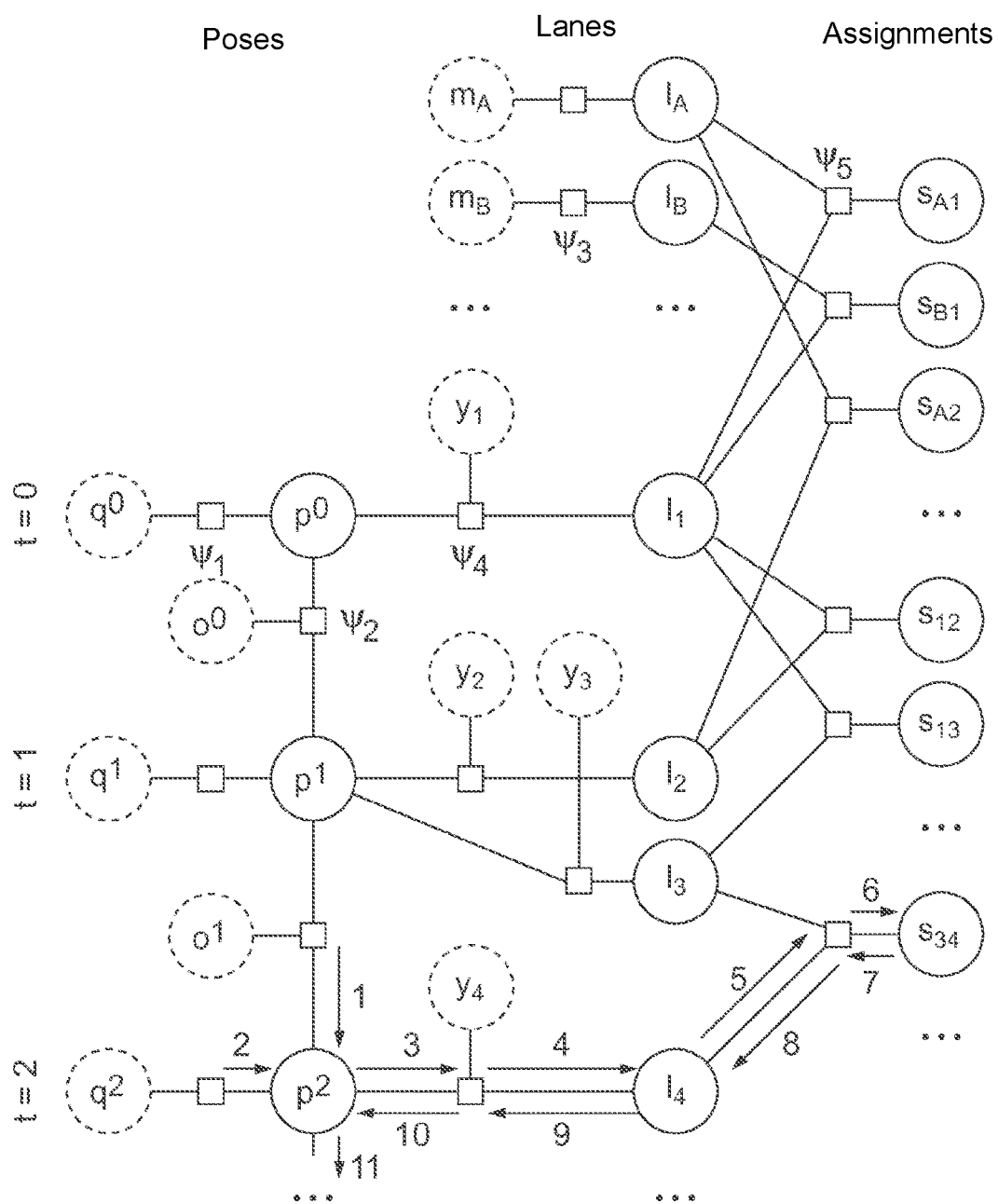
FIG. 5 shows a factor graph for a vehicle lane assignment according to an embodiment.

FIG. 5 shows a corresponding factor graph. In the factor graph, these variables are linked to factors that describe necessary preconditions and assumed conditional dependencies. The left part of the graph reveals the pose tracking and is a Markov process in the factor graph representation. The middle part ensures that the lanes such as curves are updated, while the right part comprises the problem of association. The graph correspondingly extends to the complete number of time steps and lane observations. Overall, there are five different types of factors that model a type of observation error:

1) Factor $\psi_1$ (see equation (3)) connects the current pose pt to the observed pose $q^t$ under the assumption of a normally-distributed measuring noise with a covariance $\Sigma_{q^t}$, wherein $N_{[\mu,\Sigma]}(x)$ is the value of a multidimensional normal distribution function at point x with the mean $\mu$ and the covariance matrix $\Sigma$.

$$\psi_1(p^t, q^t) = N_{[q^t, \Sigma_{q^t}]}(p^t) \tag{3}$$

2) The factor $\psi_2$ (see equation (4)) connects the current poses of two sequential time steps to an odometry measurement $o^t$, wherein a normally-distributed measuring noise with a covariance of $\Sigma_{o^t}$ is assumed in this case as well.

$$\psi_2(p^t, q^{t+1}, o^t) = N_{[o^t, \Sigma_{o^t}]}(p^t - p^{t-1}) \tag{4}$$

3) The factor $\psi_3$ (see equation 5)) connects a lane from the map material $m_i$ to the actual lane $l_i$ that corresponds to this map lane, wherein normally distributed modeling imprecisions with a covariance of $\Sigma_m$ is assumed for all points of the map material. It is assumed that the curves use the same parameter z whereby a uniform depiction between curve points is generated. The factor is normalized by the length $\|Z\|$ of the connected area $Z = \text{def}_{m_i \wedge l_i}$ to obtain comparable values. Factors of curves without a connecting area are set to zero.

$$\psi_3(l_i, m_i) = \frac{1}{\|Z\|} \int_{z \in Z} N_{[m_i(z), \Sigma_m]}(l_i(z)) dz \tag{5}$$

4) The factor $\psi_4$ (see equation 6)) connects a lane observation from sensor data $y_i$ to the actual lane $l_i$ which corresponds to this observation and the actual pose at the time of the observation. Again, the difference between the measurement and the actual lane is modeled with a normally-distributed observation noise $\Sigma_{y_i(z)}$ that is given individually for each point of the observed curve (parameterized with z). Correspondingly, the factor is normalized with the length $\|Z\|$ of the connected area $Z = \text{def}_{y_i \wedge l_i}$.

$$\psi_4(l_i, y_i, p^t) = \frac{1}{\|Z\|} \int_{z \in Z} N_{[y_i(z), \Sigma_{y_i(z)}]}(l_i(z) - p^t) dz \tag{6}$$

5) The factor $\psi_5$ (see equation (7)) connects pairs of actual lanes $(l_i, l_j)$ to their binary display variables $s_{ij}$. The small constant value $\alpha$ regulates the similarity threshold value with which two lanes are marked as equal or unequal $(0<\alpha<1)$. The display function I(cond.) assumes the value 1 when the condition is true; otherwise it assumes the value 0. In this case as well, $\|Z\|$ is the length of the connected area $Z = \text{def}_{l_i \wedge l_j}$.

$$\psi_5(l_i, l_j, s_{ij}) = I(s_{ij} = 0)\alpha + I(s_{ij} = 1)\frac{1}{\|Z\|} \int_{c \in Z} I(l_i(z) = l_j(z)) dz \tag{7}$$

Since the proposed factor graph contains cycles, a time schedule is needed for message passing in order for the loopy belief propagation algorithm to run. Since the graph contains time-dependent variables that are inserted during operation in real time calculations, information can only be forwarded into the future and never back to the past in order to ensure that the runtime of the message passing cycle is constant. The time-independent variables can, however, be updated with new information at any time step. Consequently, their messages are recalculated at all times. Although several message passing cycles per time step can yield faster convergence, it is possible to only perform this once since a slow convergence makes it easier to find a globally optimum solution. Taking into account the aforementioned guidelines, the time sequence that is indicated by the arrows and their numbering in FIG. 5 is used in order to run the loopy belief propagation algorithm, which ultimately converges into a local optimum of the joint probability of all covered variables.

The use of the method for problems in the real world requires a suitable depiction of all variables and methods in order to calculate the messages of the factor graph using these variables. Three different types of variable distributions must be depicted: the quantity P of poses, the quantity C of curves or lanes, and the binary display variables.

a) Pose variables and messages: Pose distributions of p are approximated as a weighted mixture of normal distributions with a mean pose of $\mu_i$ and a covariance matrix of $\Sigma_i$ for the position and the angle which yields the form $$\sum_i w_i N_{[\mu_i, \Sigma_i]}(p).$$

Since it can be assumed that all of the angle variances are comparatively small, the calculations are simplified by approximating the enveloping angle distributions with a simple normal distribution.

The general message calculation (see equation (2)) requires a multiplication and marginalization of these distributions. By using the property of all normal distributions that $\int_C N_{[\mu,\Sigma]}(x) dx = c$ applies, the marginalization can be easily achieved, and the product of two pose distributions can be calculated using equation (8)

$$\sum_i w_i N_{[\mu_i, \Sigma_i]}(p) \sum_j w_j N_{[\mu_j, \Sigma_j]}(p) = \sum_k w_k N_{[\mu_k, \Sigma_k]}(p) \tag{8}$$

$$\text{mit } \sum_k{}^{-1} = \sum_i{}^{-1} + \sum_j{}^{-1};$$

$$\mu_k = \sum_k \left( \sum_i{}^{-1} \mu_i + \sum_j{}^{-1} \mu_j \right)$$

$$w_k = w_i w_j N_{[\mu_j, \Sigma_i + \Sigma_j]}(\mu_i)$$

To avoid an increasing number of mixed components, similar components can be approximated by a single distribution using equation (9).

$$w_i N_{[\mu_i, \Sigma_i]}(p) + w_j N_{[\mu_j, \Sigma_j]}(p) \approx w_k N_{[\mu_k, \Sigma_k]}(p) \tag{9}$$

-continued $$mit\ w_k = w_i + w_j;\ \mu_k = \frac{1}{w_k}(w_i\mu_i + w_j\mu_j)$$

$$\sum_k = \frac{1}{w_k}\left(w_i\sum_i + w_j\sum_j + w_1 w_2(\mu_i - \mu_j)(\mu_i - \mu_j)^T\right)$$

b) Curve variables and messages: Curve distributions are depicted as a polygonal chain with individual pose distributions $\gamma(z) \in P$ for each point $z \in Z$, wherein Z is the group of represented points. The pose distributions in between are assumed as a linear interpolation of the adjacent points. Accordingly, additional curve points can be used as needed, and the overall number of points per curve can be reduced by removing those points that are already similar to the linear interpolation of their adjacent points.

The curve parameter z is considered as being the same for all message calculations that relate to multiple curves. To find this common parameter z of two curves, the shift between the original parameters $z_1$ and $z_2$ of these curves is determined by projecting all the points of the two curves onto each other and taking the average parameter difference between the original points and their projection on the other curve as the parameter shift. By using this assumption, two other simplifications can be applied:

1) All of the messages relating to curves can be calculated separately for each z defined in the relevant curves.

2) The integrals in the factors $\psi_3$, $\psi_4$ and $\psi_5$ are then reduced to their integrand since the common area of definition is only the individual z for which the message is presently being calculated.

It should be noted that these simplifications cannot be used for the message identified as 10 in FIG. 5 since the involved curves are in different coordinate systems. Accordingly, the integral should be evaluated for each possible pair of curve parameters, which leads to an overall group of weighted pose distributions.

c) Binary displays: These are represented with a probability value in the range of [0,1], which makes it possible to replace the display functions in $\psi_5$ with the continuous probabilities $s_{ij}$ and $1-s_{ij}$.

In summary, the depicted procedures are sufficient to calculate all messages using the general formula of equation (2), wherein the chosen representation of the variables is retained. Moreover, the calculations are computationally efficient. The two main reasons for this efficiency are, on the one hand, that all of the factors only use quadratic noise so that a coherent representation is possible which is largely based on normal distributions and, on the other hand, that the aforementioned approximations can be used to limit the overall number of mixed components or points per lane to a constant minimum in order to ensure a limited maximum runtime per updating cycle.

The previously described embodiment of the method was evaluated in two ways: with simulated test data and in a real scenario.

Simulating precise input and adding artificial noise enables systematic tests that reveal the sensitivity to different types of sensor noise which would not be possible in real tests. The employed test environment generates open roads with random curves, random curve changes and random numbers of lanes, wherein lanes are randomly divided or combined, as well as intersections with random angles to the main direction of travel. The current pose is simulated by driving on these lanes with random lane changes in between. The simulated scenario covers most situations that occur in rural or city environments. Different types of noise were added to the input data that were used in the method. The global position measurement has a normally distributed offset $$N_{[\mu_q,\sigma_q^2]}(q)$$

and the global angle measurement has an offset $$N_{[\mu_\alpha,\sigma_\alpha^2]}(q)$$

The lane measurements have a limited field of vision $l_y$, and random geometric imprecisions, for example a lateral, an angled or a curved offset, are added with standard deviations $\sigma_1$, $\sigma_a$ and $\sigma_c$. The lanes are randomly hidden with the probability $y_-$ or added with the probability $y_+$.

Figure 6:
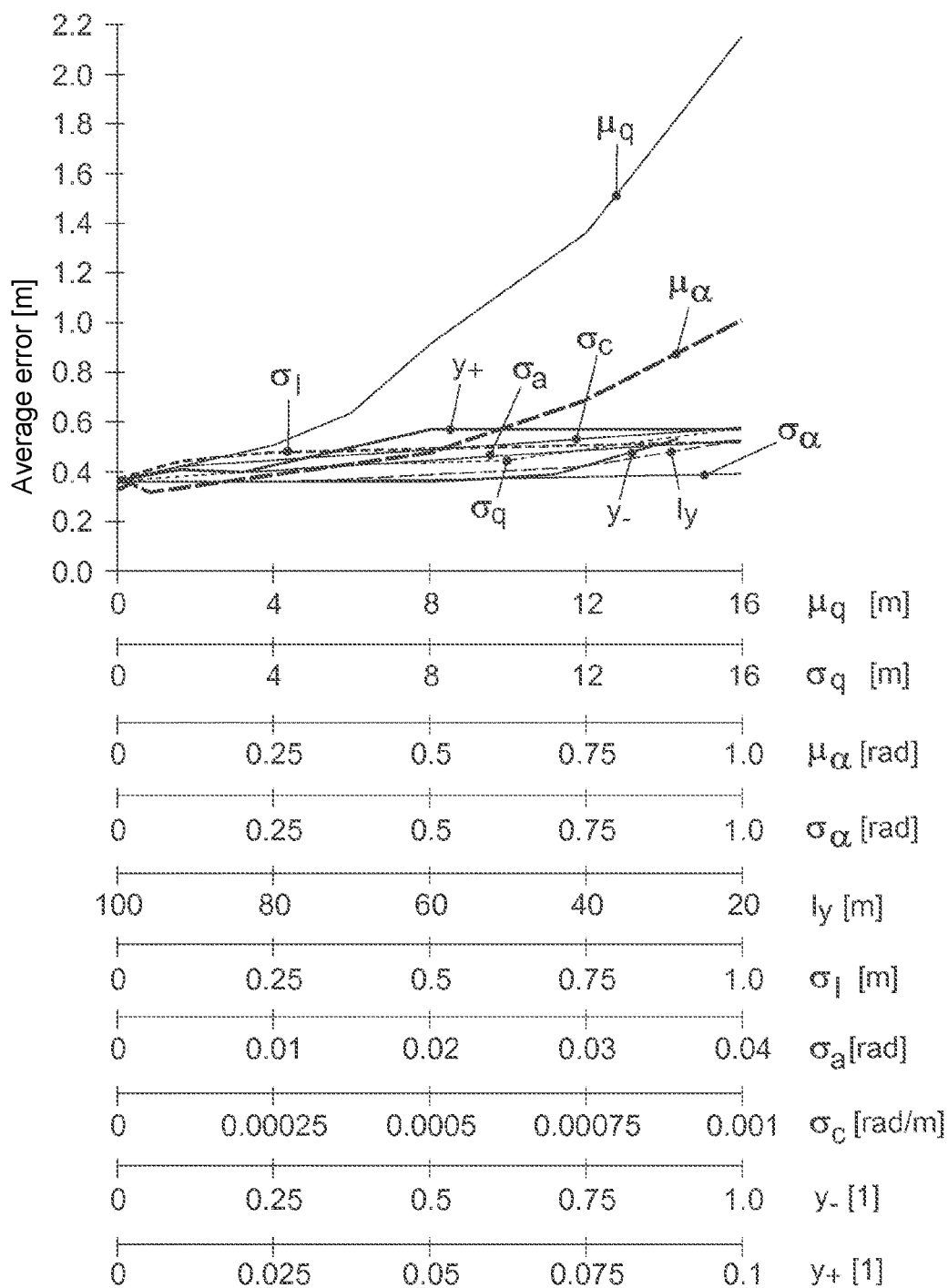
FIG. 6 shows a mean positioning error for various sources and quantities of faults.

Each noise source is evaluated separately by simulating a trip of 100 km. FIG. 6 shows the mean positioning error for each source and level of noise. FIG. 6 clearly shows that geometric imprecisions of the lane ($l_y$, $\sigma_1$, $\sigma_a$, $\sigma_c$, $y_-$, $y_+$) as well as white noise when measuring the global position and the angle ($\sigma_q$, $\sigma_\alpha$) only have slight effects on positioning accuracy with a maximum rise of 0.21 m in comparison to perfect data. Systematic shifts in the measurements of the global position and the angle have a greater effect on the error, wherein the algorithm is still capable of reducing the systematic positioning error $\mu_q$ by a factor of 8.

In addition to the overall distance error, other evaluation criteria are considered: The lateral component of the distance error, the mean angle error and the relationship of the time in which the association between the lanes was correctly identified.

Independent of the source and level of noise (within the tested areas as shown in FIG. 6), the mean lateral error always remains below 0.40 m, the mean angle error remains below 0.011 rad, and the rate of correct association remains above 0.987. These values show that the identification of the correct lane, the lateral offset and the angle are very insensitive to noise. Accordingly, the distance error that is introduced by distorted measurements is primarily reflected in an offset in the longitudinal direction.

Figure 7:
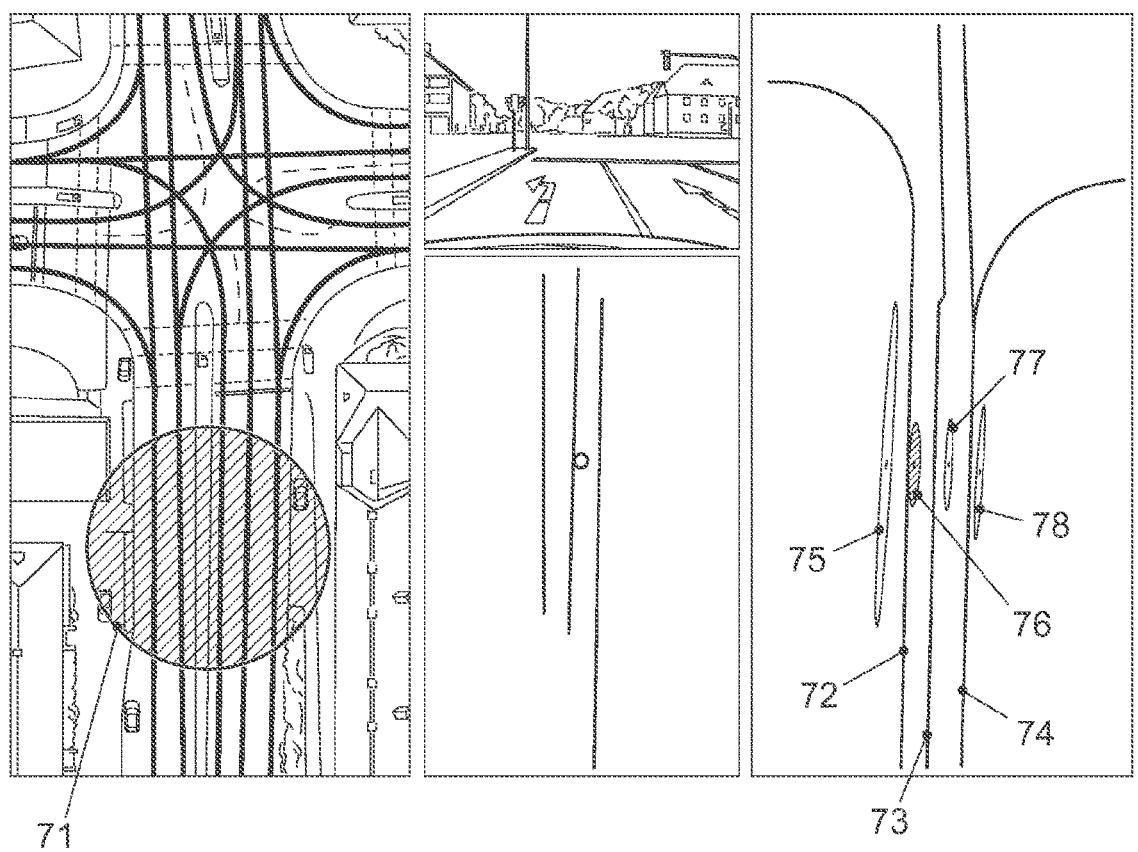
FIG. 7 schematically shows map-based lane arrangements, locally detected lane arrangements, and poses for a vehicle calculated therefrom.

A real test was performed with a roadmap with a precision at the lane level, a standard GPS, and a lane recognition system. FIG. 7 show a typical scene of a trip together with the map and the calculated pose. As a reference, a highly precise positioning system was used that has a deviation of less than 5 cm. In a trip with an overall length of 13.2 km in Wolfsburg, Germany, the calculated global position had an average overall offset of 1.71 m, an average lateral offset of 0.39 m, and an average angular offset of 0.009 rad with respect to the reference system. On the left, FIG. 7 shows map lanes in conjunction with a satellite image as a visualization aid and the global pose measurement 71. A camera image and lane measurements generated therefrom are shown in the middle. Calculated hidden variables for the middle of the lanes 72, 73 and 74 and the vehicle poses 75 to 78 are shown on the right, wherein pose 76 is the pose with the greatest probability.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

10 Vehicle
11 Arrangement determining device
12 Driver assistance system
13 Connection
14 Sensor, camera
15 Processing device
16 Antenna
17 Vehicle bus
18 Wheel sensor
20 Method
21-28 Step
71 Global pose measurement
72-74 Middle of the driving lines
75-78 Vehicle poses

What is claimed is:

1. A method for determining arrangement information for a vehicle, wherein the arrangement information comprises a position of the vehicle and an orientation of the vehicle with reference to a stationary coordinate system, wherein the method comprises:
   detecting a local lane arrangement in surroundings of the vehicle with sensors of the vehicle, wherein the local lane arrangement indicates an arrangement of lanes in the surroundings of the vehicle with reference to the vehicle;
   determining a first lane arrangement depending on the local lane arrangement, detected by the sensors, and previously determined arrangement information for the vehicle, wherein the first lane arrangement indicates an arrangement of lanes in the surroundings of the vehicle with reference to the stationary coordinate system, wherein a lane of the first lane arrangement comprises a point list representing the center of the lane, wherein each point on the point list corresponds to a position observed with the sensors of the vehicle;
   determining a second lane arrangement depending on specified map material and a global position measurement or the previously determined arrangement information for the vehicle, wherein the second lane arrangement indicates an arrangement of lanes in the surroundings of the vehicle with reference to the stationary coordinate system, wherein a lane of the first lane arrangement comprises a point list representing the center of the lane, wherein each point on the point list corresponds to a respective point on the map material;
   determining similarity information depending on a geometric similarity between the first lane arrangement and the second lane arrangement, wherein the similarity information is determined based on point-by-point comparison of points on the point list of the first lane information with corresponding points on the point list of the second lane information; and
   updating the previously determined arrangement information for the vehicle depending on the similarity information.

2. The method according to claim 1, wherein the method furthermore comprises updating a previously determined lane arrangement hypothesis depending on the similarity information, wherein the lane arrangement hypothesis indicates a hypothesis for an arrangement of lanes in the surroundings of the vehicle with reference to the stationary coordinate system.

3. The method according to claim 1, wherein the arrangement information of the vehicle comprises parameters of a multidimensional normal distribution for the position and orientation of the vehicle.

4. The method according to claim 1, wherein a lane of a lane arrangement comprises a point list representing the middle of the lane, wherein each point on the point list has parameters of a multidimensional normal distribution for a position with reference to the stationary coordinate system.

5. The method according to claim 1, wherein the method furthermore comprises updating the previously determined arrangement information for the vehicle depending on odometry data of the vehicle.

6. The method according to claim 1, wherein the method furthermore comprises:
   detecting a stationary position of the vehicle, wherein the stationary position indicates the position of the vehicle with reference to the stationary coordinate system; and
   updating the previously determined arrangement information for the vehicle depending on the detected stationary position of the vehicle.

7. The method according to claim 1, wherein the method is performed repeatedly, wherein a repetition rate for the repeated performance of the method lies within a range of 25 to 400 repetitions per second.

8. The method according to claim 1, wherein determining the similarity information comprises:
   determining lane information for the first lane arrangement by means of the sensors of the vehicle, wherein the lane information comprises lane marking types and/or stop line positions and/or traffic sign positions; and
   comparing the lane information for the first lane arrangement with map-material-based lane information for the second lane arrangement.

9. The method according to claim 1, wherein the first lane arrangement indicates an arrangement of at least two lanes, and/or the second lane arrangement indicates an arrangement of at least two lanes, wherein determining the similarity information comprises determining multiple items of pair similarity information, wherein each of the multiple items of pair similarity information is determined depending on a geometric similarity of a respective pair of two lanes, wherein a respective pair of two lanes comprises one lane from the first lane arrangement and one lane from the second lane arrangement.

10. The method of claim 9, wherein the updating of the previously determined arrangement information for the vehicle depending on the similarity information comprises:
   for each item of pair similarity information of the multiple items of pair similarity information: determining respective weighted update information depending on the respective pair similarity information, wherein the weighted update information comprises arrangement information for the vehicle under the assumption that the lane of the respective pair relates to the same actual lane, and wherein the weight of the weighted update information indicates a probability that the lane of the respective pair relates to the same actual lane; and updating the previously determined arrangement information for the vehicle depending on the weighted update information.

11. The method of claim 10, wherein the arrangement information of the vehicle and the weighted items of update information each comprise parameters of a multidimensional normal distribution for the position and orientation of the vehicle;

wherein the updating of the previously determined arrangement information for the vehicle depending on the weighted update information comprises multiplying the normal distribution of the arrangement information with the normal distributions of the items of update information.

12. An arrangement determining device for determining arrangement information for a vehicle, wherein the arrangement information comprises a position of the vehicle and an orientation of the vehicle with reference to a stationary coordinate system, wherein the arrangement determining device comprises:

sensors for detecting a local lane arrangement in surroundings of the vehicle, wherein the local lane arrangement indicates an arrangement of lanes in the surroundings of the vehicle with reference to the vehicle; and a processing device that is configured to determine a first lane arrangement depending on the local lane arrangement, detected by the sensors, and previously-determined arrangement information for the vehicle, wherein the first lane arrangement indicates an arrangement of lanes in the surroundings of the vehicle with reference to the stationary coordinate system, wherein a lane of the first lane arrangement comprises a point list representing the center of the lane, wherein each point on the point list corresponds to a position observed with the sensors of the vehicle;

to determine a second lane arrangement depending on specified map material and a global position measurement or the previously determined arrangement information for the vehicle, wherein the second lane arrangement indicates an arrangement of lanes in the surroundings of the vehicle with reference to the stationary coordinate system, wherein a lane of the second lane arrangement comprises a point list representing the center of the lane, wherein each point on the point list corresponds to a respective point of the map material;

to determine similarity information depending on a geometric similarity between the first lane arrangement and the second lane arrangement, wherein the similarity information is determined based on point-by-point comparison of points on the point list of the first lane information with corresponding points on the point list of the second lane information; and to update the previously determined arrangement information for the vehicle depending on the similarity information.

13. The arrangement determining device of claim 12, wherein the arrangement determining device is designed to perform the method according to one of the claims 1-11.

14. A vehicle comprising:

an arrangement determining device according to claim 12; and a driver assistance system that provides an automatic driving function for the vehicle and is coupled to the arrangement determining device;

wherein the automatic driving function is performed by the arrangement determining device based on the updated arrangement information.

15. The vehicle according to claim 14, wherein the arrangement determining device is configured to perform the method according to claim 2, wherein the automatic driving function is performed by the arrangement determining device based on the updated lane arrangement hypothesis.

16. A method for determining arrangement information for a vehicle, wherein the arrangement information comprises a position of the vehicle and an orientation of the vehicle with reference to a stationary coordinate system, wherein the method comprises:

detecting a local lane arrangement in surroundings of the vehicle with sensors of the vehicle, wherein the local lane arrangement indicates an arrangement of lanes in the surroundings of the vehicle with reference to the vehicle;

determining a first lane arrangement depending on the local lane arrangement and previously determined arrangement information for the vehicle, wherein the first lane arrangement indicates an arrangement of lanes in the surroundings of the vehicle with reference to the stationary coordinate system, wherein a lane of the first lane arrangement comprises a point list representing the center of the lane, wherein each point on the point list corresponds to a position observed with the sensors of the vehicle;

determining a second lane arrangement depending on specified map material, wherein the second lane arrangement indicates an arrangement of lanes in the surroundings of the vehicle with reference to the stationary coordinate system, wherein a lane of the first lane arrangement comprises a point list representing the center of the lane, wherein each point on the point list corresponds to a respective point on the map material;

determining similarity information depending on a geometric similarity between the first lane arrangement and the second lane arrangement, wherein the similarity information is determined based on point-by-point comparison of points on the point list of the first lane information with corresponding points on the point list of the second lane information; and updating the previously determined arrangement information for the vehicle depending on the similarity information; wherein the first lane arrangement indicates an arrangement of at least two lanes, and/or the second lane arrangement indicates an arrangement of at least two lanes, wherein determining the similarity information comprises determining multiple items of pair similarity information, wherein each of the multiple items of pair similarity information is determined depending on a geometric similarity of a respective pair of two lanes, wherein a respective pair of two lanes comprises one lane from the first lane arrangement and one lane from the second lane arrangement; wherein the updating of the previously determined arrangement information for the vehicle depending on the similarity information comprises:

for each item of pair similarity information of the multiple items of pair similarity information: determining respective weighted update information depending on the respective pair similarity information, wherein the weighted update information comprises arrangement information for the vehicle under the assumption that the lane of the respective pair relates to the same actual lane, and wherein the weight of the weighted update information indicates a probability that the lane of the respective pair relates to the same actual lane; and updating the previously determined arrangement information for the vehicle depending on the weighted update information.

17. The method of claim 16, wherein the arrangement information of the vehicle and the weighted items of update information each comprise parameters of a multidimensional normal distribution for the position and orientation of the vehicle;

wherein the updating of the previously determined arrangement information for the vehicle depending on the weighted update information comprises multiplying the normal distribution of the arrangement information with the normal distributions of the items of update information.

* * * * *